United States Patent [19]
Primeau

[11] Patent Number: 5,105,764
[45] Date of Patent: Apr. 21, 1992

[54] BIRD FEEDER WITH ROOF MOUNTED FLOWER CONTAINER

[76] Inventor: John A. Primeau, 5681 Globe, Westland, Mich. 48185

[21] Appl. No.: 606,092

[22] Filed: Oct. 31, 1990

[51] Int. Cl.⁵ .............................................. A01K 39/00
[52] U.S. Cl. ................................... 119/52.3; D30/126
[58] Field of Search ................... 119/52.2, 52.3, 57.8, 119/57.9, 23, 51.5, 69.5; D30/110, 111, 124, 125, 126, 127, 128

[56] References Cited
U.S. PATENT DOCUMENTS

| | | | |
|---|---|---|---|
| 2,216,511 | 10/1940 | Copeman | 119/52.3 |
| 2,715,386 | 8/1955 | Jones | 119/51.5 |
| 3,017,859 | 1/1962 | Stern | 119/57.8 |
| 4,019,462 | 4/1977 | Palfalvy | 119/57.8 |
| 4,144,842 | 3/1979 | Schlising | 119/52.3 |
| 4,515,108 | 5/1985 | Rankin, Jr. | 119/23 |
| 4,867,104 | 9/1989 | Vandiver | 119/52.3 |
| 4,896,628 | 1/1990 | Kadunce | 119/52.2 |

Primary Examiner—Robert P. Swiatek
Assistant Examiner—Todd E. Manahan
Attorney, Agent, or Firm—Charles W. Chandler

[57] ABSTRACT

An ornamental bird feeder that includes an upright tubular enclosure having a gable roof that is cut away to provide an access opening for adding new bird seed into the enclosure. A flower container is removably mounted in the roof access opening to provide plant foliage in the space above and alongside the roof area. The enclosure is equipped with an annular tray structure near its lower end, such that birds can have access to bird feeder openings extending around the entire perimeter of the enclosure.

17 Claims, 3 Drawing Sheets

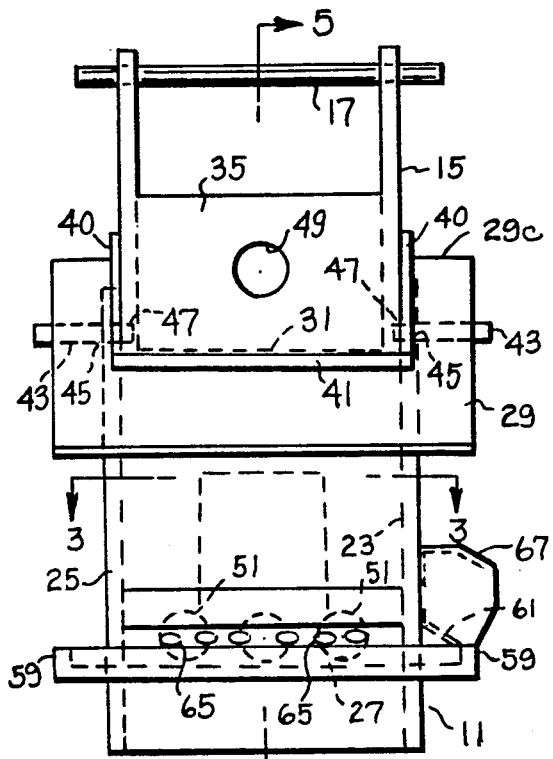
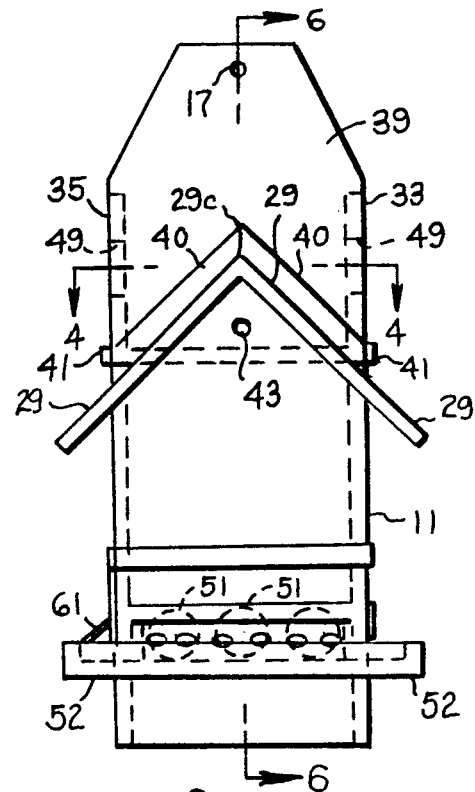
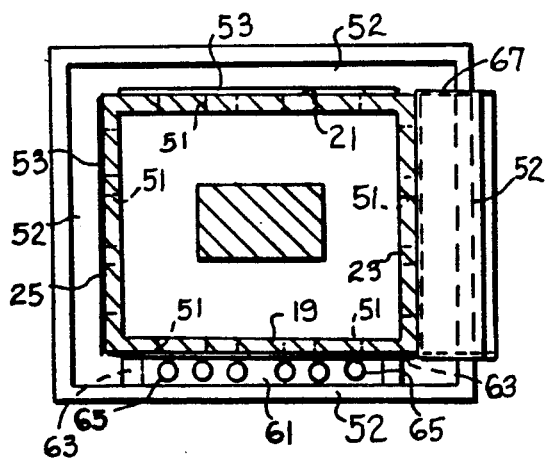
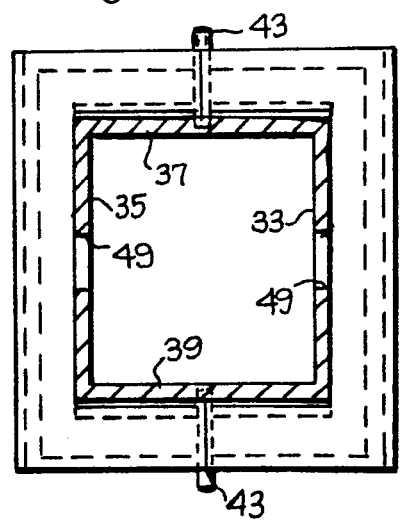
fig. 1
fig. 2
fig. 3
fig. 4

BIRD FEEDER WITH ROOF MOUNTED FLOWER CONTAINER

BACKGROUND AND SUMMARY OF THE INVENTION

This invention relates to a bird feeder having an ornamental flower container located within the roof portion of an upright enclosure that is used to contain bird seed. Small openings are formed in a lower portion of the enclosure for delivering measured quantities of bird seed from the enclosure to an annular tray means that encircles the enclosure. The ornamental flower container is removably mounted on the upright enclosure, whereby the container can be lifted from the enclosure when it is desired to pour new bird seed into the enclosure.

Living plants or artificial flowers may be contained within the flower container. The plants will preferably fully occupy the container so that the leaves and blossoms extend above and along outer side areas of the container. The blossoms and plant foliage add an ornamental feature to the bird feeder.

THE DRAWINGS

FIG. 1 is a side elevational view of a bird feeder constructed according to the teachings of the invention.

FIG. 2 is an end elevational view of the FIG. 1 bird feeder.

FIG. 3 is a transverse sectional view taken on line 3—3 in FIG. 1.

FIG. 4 is a transverse sectional view taken on line 4—4 in FIG. 2.

DESCRIPTION OF A PREFERRED EMBODIMENT OF THE INVENTION

Figure 5:
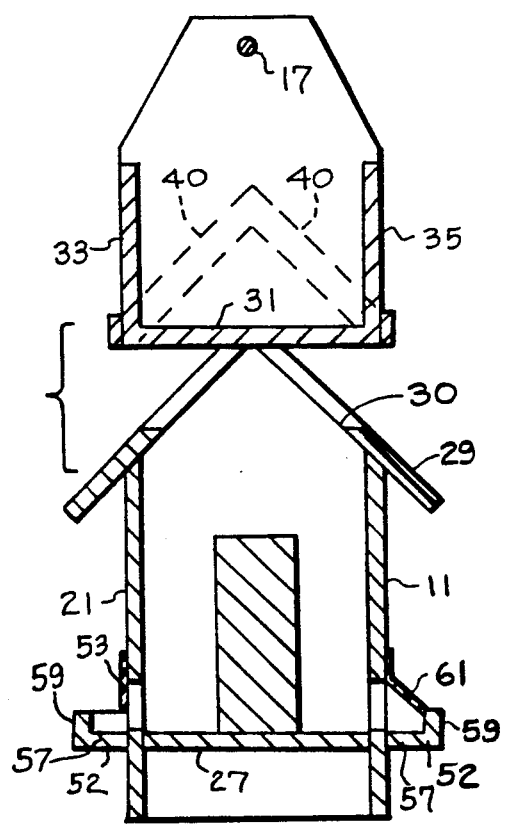
FIG. 5 is a sectional view taken on line 5—5 in FIG. 1.

The drawings show a bird feeder that includes a hollow upright tubular enclosure 11 having a gable roof 29. A section of the roof is cut away to form an access opening for pouring bird seed into the enclosure. Removably mounted within the roof opening is a flower container 15. The container is normally latched to enclosure 11 so that the container and enclosure form a single unitary construction. A lifter rod 17 extends across the flower container to provide a suspension device for the enclosure-container assembly. The ornamental feeder can thereby be suspended from a tree branch, patio roof structure or other overhead support by attaching a chain or cord to lifter rod 17. Rod 17 also serves as a handle for manually lifting the flower container off of the tubular enclosure when it becomes necessary to pour new bird seed into the enclosure.

Enclosure 11 comprises two parallel upright side walls 19 and 21, and two interconnecting upright end walls 23 and 25. As seen in FIGS. 3 and 4 the four walls are joined at their corner edges so that the enclosure has a rectangular plan cross section. A floor 27 extends between the upright walls for containing a relatively large quantity of bird seed.

The upper edges of end walls 23 and 25 have triangular gable configurations for attachment of a gable roof 29 to the enclosure. The gable roof comprises two flat panels 29a and 29b joined together to define a roof peak 29c. The roof panels 29a and 29b are cut away in the space between end walls 23 and 25 to form an access opening 30 for pouring bird seed into enclosure 11 when container 15 is removed from its normal position seated within the access opening. FIG. 5 shows flower container 15 partially lifted off of enclosure 11 to expose the access opening.

Flower container 15 comprises a bottom wall 31, two side walls 33 and 35, and two end walls 37 and 39. As seen in FIG. 4, the flower container has a rectangular plan cross-sectional configuration. The container end walls 37 and 39 are spaced so as to nest against enclosure end walls 23 and 25 when the container is seated in access opening 30. The container is thus precluded from endwise displacement relative to enclosure 11.

Extending along the outer surface of each container end wall are two inclined container locator strips 40. When the container is placed in access opening 30, these strips contact the upper surfaces of roof panels 29a and 29b to locate the container, and also to prevent rain water from passing through the cracks that would otherwise be formed between the roof access opening and the container. Additional rain protection strips 41 are carried on the outer surfaces of container side walls 33 and 35.

A sealing element, now shown, can be mounted along the edges of access opening 30.

The flower container is latched to the enclosure by means of two removable pegs 43. Each peg extends through a support hole 45 in an enclosure end wall into a socket 47 in the associated container end wall. The pegs are manually removed when it is desired to lift container 15 away from enclosure 11.

Container 15 can be used as a planter box for growing plants. Alternately, the container can be used as a platform for a flower pot or a liner. The plants will preferably be growing plants although artificial flowers can also be accommodated. In an optimized arrangement the flower will completely fill the container so as to have foliage and blossoms extend out of the container (vertically and laterally). Openings 49 are formed through side walls 33 and 35 to permit the plant foliage to extend laterally out of the container and downwardly along the roof area of enclosure 11, thereby presenting a unique ornamental effect. Lifter rod 17 is slidably removable from the flower container, e.g. when it is desired to place new plants into the container or remove plants from the container.

Referring to the lower portion of enclosure 11, each of the four upright walls 19, 21, 23 and 25 has a tray structure 52 attached to its outer surface in horizontal alignment with internal floor 27. As seen in FIGS. 3 and 4, the four trays cooperatively encircle the upright enclosure so that birds can perch along all four sides of the enclosure. Each tray comprises a horizontal platform wall 57 and an upwardly extending rim wall 59. The rim wall is approximately one half inch high to contain any excess bird seed that might otherwise fall or blow away from platform wall 57. Each of the four upright walls 19, 21, 23 and 25 has three circular holes 51 extending therethrough in the zone immediately above floor 27. The holes in walls 21 and 25 are partially obstructed by transparent plastic plates 53, to form moon-shaped openings for measured discharge of bird seed from enclosure 11 onto the associated tray platform walls 57.

The three holes 51 in walls 19 and 23 communicate with plastic shield plates 61 that are sloped outwardly and downwardly toward the associated rim wall 59. Triangular blocks 63 support plates 61 in their sloped positions (attitudes). Each shield plate 61 has six holes (passages) 65 extending therethrough, whereby a single bird can extend its beak through any one of the passages to extract bird seed from the space circumscribed by shield plate 61. Each hole 65 has a diameter of approximately one half inch.

Figure 6:
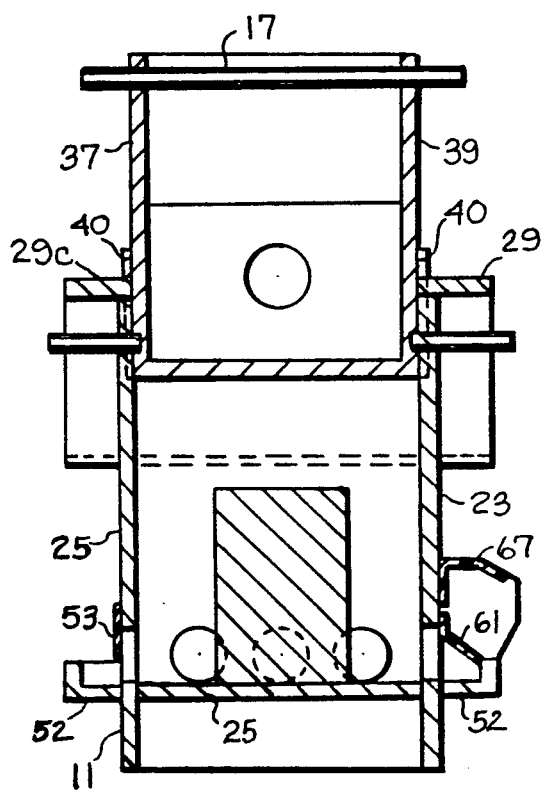
FIG. 6 is a sectional view taken on line 6—6 in FIG. 2.

A hood structure 67 is fastened to wall 23 in the space above the associated tray structure. As seen in FIG. 6, the hood structure extends outwardly beyond rim wall 59 so that a bird can perch on the rim wall only when its head is located underneath the hood structure. The roof portion of the hood structure is spaced about two inches above the associated rim wall 59, such that only relatively small birds can perch on the rim wall while having access to bird seed behind the sloped shield plate 61.

The general purpose for plates 53 and 61 is to effectively reduce the gravitational flow of bird seed from enclosure 11 onto the tray walls, so as to reduce seed wastage to a minimal amount.

Figure 7:
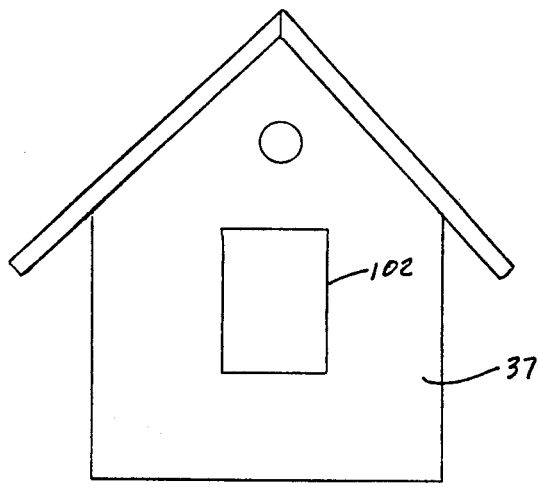
FIG. 7 is a view of another enclosure wall having a opening for receiving bird feed.
Figure 8:
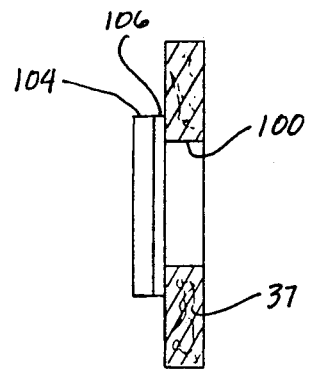
FIG. 8 is a sectional view as seen from the right side of FIG. 7 to show the removable door.

FIG. 7 shows a wall 37 with a rectangular feed-receiving opening 100. A door 102 having dimensions greater than the opening 100 is removably mounted over the opening to block access therethrough. Preferably hook and loop fastener means 104 and 106 are mounted around the outside surface of opening 100 and on the inside surface of door 102 to provide means for releasably attaching the door over the opening. The door can be removed to provide access into the interior of the closure.

Figure 9:
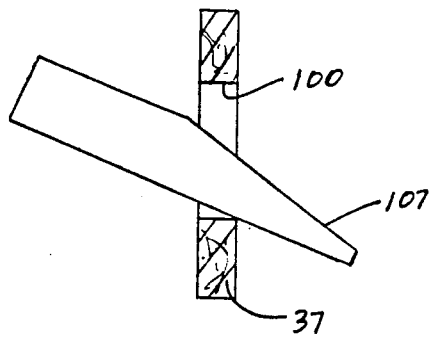
FIG. 9 is a view illustrating a chute for passing bird feed into the enclosure through the opening of FIG. 7.
Figure 10:
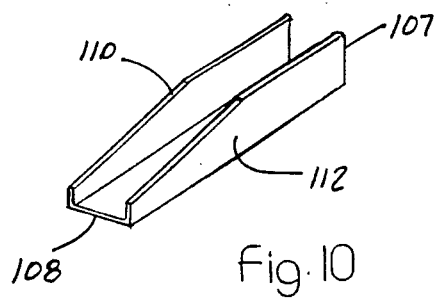
FIG. 10 is a respective view of the chute.

A sheet metal chute 107 is illustrated in FIGS. 9 and 10. The chute can be inserted through the opening 100 for delivering feed into the interior of the enclosure. The chute is preferably formed of aluminum and has an elongated bottom wall 108 and a pair of side walls 110 and 112.

Figure 11:
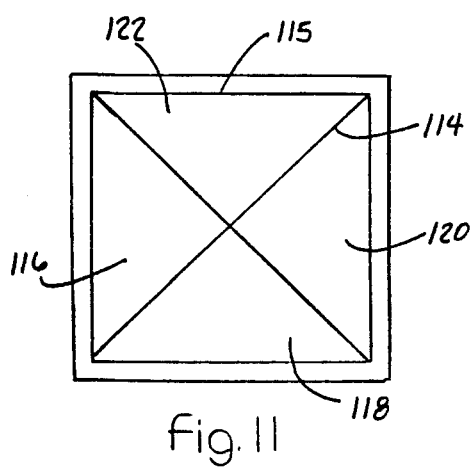
FIG. 11 is a view of the bottom of the floor of the enclosure.
Figure 12:
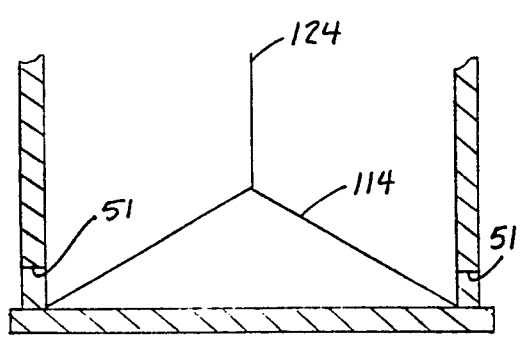
FIG. 12 is a view showing a sheet metal guide mounted in the bottom of the enclosure.

FIGS. 11 and 12 are views of the bottom of the enclosure with a sheet metal guide 114. The sheet metal guide has a somewhat tapered configuration with a border 115 that accommodates the rectangular bottom of the enclosure but which permits the guide 114 to be removed. The border of the guide rests on the bottom floor of the enclosure and is bent to form four rectangular quadrants 116, 118, 120 and 122. The four quadrants combine to form a peak 124 so that each of the quadrants forms a slidable base for the feed to flow toward the openings such as openings 51. The guide insures that the feed in the center of the bottom floor does not pile up and become stagnant.

The drawings necessarily depict one particular form of the invention. However, it will be appreciated that the invention can be practiced in various forms.

I claim:

1. An ornamental bird feeder, comprising: an upright enclosure having two parallel side walls and two end walls joined together so that the enclosure has a rectangular plan cross-section; a floor extending between said end walls and side walls for containment of bird seed within the enclosure; a rimmed tray extending outwardly from each side wall and each end wall in horizontal alignment with said floor; openings in said side walls and said end walls near said floor for supplying limited quantities of bird seed to each associated tray; each end wall having an upper edge that has a gable configuration; a gable roof extending transversely across the enclosure beyond the gable edges of the enclosure end walls; sections of the gable roof between the enclosure end walls being cut away; a flower container removably seated in the cut away section of the gable roof; and means for releasably connecting said flower container to the enclosure, whereby the container is liftable from the enclosure for pouring bird seed into the enclosure through the cut away section of the roof.

2. The bird feeder of claim 1, wherein said flower container comprises two container end walls spaced apart to nest against the end walls of the enclosure.

3. The bird feeder of claim 2, wherein said releasable connecting means comprises two sockets in the container end walls, two support holes extending through the enclosure walls in registry with said sockets and two pegs extendable through the support holes into the sockets.

4. The bird feeder of claim 2, and further comprising a lifter rod extending horizontally between the container end walls to facilitate manual lifting of the container from the enclosure; said lifter rod being removable from the container to facilitate the placement of flowers in the container.

5. The bird feeder of claim 2, wherein said flower container comprises two parallel side walls interconnecting the container end walls so that the container has a rectangular plan configuration.

6. The bird feeder of claim 5, wherein the container side walls are spaced apart substantially the same distance as the enclosure side walls, whereby the container side walls are planar continuations of the enclosure side walls.

7. The bird feeder of claim 5, and further comprising a flower foliage hole extending through each container side wall.

8. The bird feeder of claim 1, wherein each tray comprises a platform wall having an outer edge, and a rim wall extending upwardly from the outer edge of the platform wall; at least one of the trays having a downwardly sloped shield extending from the outer surface of the enclosure to the associated rim wall; and a number of passages extending through the shield at spaced points therealong; each passage being sized to permit a single bird to extend its beak through the passage for access to bird seed located within the space circumscribed by the shield.

9. The bird feeder of claim 8, wherein each passage is a circular hole having a diameter of approximately one half inch.

10. The bird feeder of claim 8, and further comprising a hood structure associated with said one tray, said hood structure extending outwardly from the enclosure beyond the associated rim wall; said hood structure being spaced a predetermined distance above the rim wall to effectively limit the size bird that can perch on the rim wall.

11. The bird feeder of claim 10, wherein said hood structure is spaced above the associated rim wall approximately two inches.

12. An ornamental bird feeder, comprising: a hollow upright tubular enclosure having a floor for containment of bird seed thereon; openings in said tubular enclosure near said floor for supplying bird seed to birds perched on the enclosure; a gable roof closing the upper end of said enclosure; sections of the gable roof being cut away to form a space for pouring bird seed into the enclosure; a flower container removably seated in the cut away section of the gable roof; and means for releasably connecting the flower container to the enclosure.

13. The bird feeder of claim 12, wherein said enclosure has a rectangular plan configuration comprised of two parallel side walls and two end walls; said flower container comprising two side walls constituting planar extensions of the enclosure side walls, and two end walls adapted to nest within the enclosure end walls.

14. The bird feeder of claim 13 wherein the container end walls have upper edges located an appreciable distance above the upper edges of the container side walls; and a lifter rod extending between the container end walls parallel to the container side walls; said lifter rod being located near the upper edges of the container end walls so as to be accessible without adversely disturbing plant foliage within the container.

15. The bird feeder of claim 14, wherein said lifter rod is removable from the container to facilitate placement of flowers in the container.

16. The bird feeder of claim 13, wherein the gable roof has a length dimension parallel to the gable peak and a width dimension normal to the gable peak; the length and width dimensions of the roof being greater than the corresponding dimensions of the enclosure whereby the roof overhangs the enclosure.

17. The bird feeder of claim 12, and further comprising an annular tray means encircling said tubular enclosure immediately below said seed supply openings.

* * * * *